(12) United States Patent
Taylor et al.

(10) Patent No.: US 7,433,452 B2
(45) Date of Patent: Oct. 7, 2008

(54) METHOD AND APPARATUS FOR CASHLESS TRANSACTIONS VIA A TELECOMMUNICATIONS NETWORK

(75) Inventors: Stephen Taylor, Liverpool (GB); John Cavanagh, Warrington (GB); Adrian Williams, Warrington (GB); David William Harrison, Nantwich (GB)

(73) Assignee: Ericsson AB, Stockholm (SE)

( * ) Notice: Subject to any disclaimer, the term of this patent is extended or adjusted under 35 U.S.C. 154(b) by 0 days.

(21) Appl. No.: 10/506,919

(22) PCT Filed: Mar. 3, 2003

(86) PCT No.: PCT/GB03/00872

§ 371 (c)(1),
(2), (4) Date: May 4, 2005

(87) PCT Pub. No.: WO03/075229

PCT Pub. Date: Sep. 12, 2003

(65) Prior Publication Data

US 2005/0226401 A1    Oct. 13, 2005

(30) Foreign Application Priority Data

Mar. 5, 2002    (GB) ................................. 0205104.3

(51) Int. Cl.
*H04M 11/00* (2006.01)
(52) U.S. Cl. .................... 379/93.12; 379/93.37; 705/16
(58) Field of Classification Search ............ 379/93.12, 379/91.01, 91.02, 93.37; 455/406, 557, 408; 705/16, 40, 26
See application file for complete search history.

(56) References Cited

U.S. PATENT DOCUMENTS

| 4,201,887 | A | * | 5/1980 | Burns | ................... 379/93.37 |
| 5,157,717 | A | | 10/1992 | Hitchcock | |
| 5,408,513 | A | * | 4/1995 | Busch et al. | ............ 379/91.01 |
| 5,953,700 | A | | 9/1999 | Kanevsky et al. | |

(Continued)

FOREIGN PATENT DOCUMENTS

EP    0 913 978 A2    5/1999

(Continued)

*Primary Examiner*—Stella L Woo
(74) *Attorney, Agent, or Firm*—Kirschstein, et al.

(57) ABSTRACT

A method of using a telecommunications network cashless transaction service is provided, in which a user accesses the service using a network access instrument, such as a mobile phone which produces a signal. The signal is forwarded to an interface device of the network, which extracts service and user identity data therefrom, and passes the data to a processing unit for the service of the network. The service processing unit processes the data, instructs the interface device to forward the access instrument signal to an input output device of the network, and instructs the input output device to request transaction details from the user. The details are sent to the input output device, which passes them to the service processing unit which processes the details and decides whether or not the transaction can proceed, causes output of a signal conveying acceptance or rejection of the transaction to the user, and, if the transaction can proceed, arranges for the transaction to be carried out. The telecommunications network may comprise a fixed network, the interface device may be a service switching point, the service processing unit may be a service control point, and the input output device may be an interactive/intelligent voice recognition unit.

48 Claims, 3 Drawing Sheets

U.S. PATENT DOCUMENTS

| | | | |
|---|---|---|---|
| 6,195,541 B1 * | 2/2001 | Griffith | 379/93.12 |
| 6,356,752 B1 * | 3/2002 | Griffith | 455/406 |
| 6,868,391 B1 * | 3/2005 | Hultgren | 379/91.01 |
| 6,934,689 B1 * | 8/2005 | Ritter et al. | 705/17 |
| RE38,801 E * | 9/2005 | Rogers | 379/91.01 |
| 2003/0130921 A1 * | 7/2003 | Force et al. | 705/35 |

FOREIGN PATENT DOCUMENTS

| | | |
|---|---|---|
| EP | 1 093 097 A2 | 4/2001 |
| GB | 2 362 012 A | 11/2001 |
| WO | WO 95/20195 | 7/1995 |
| WO | WO 97/45814 | 12/1997 |
| WO | WO 02/01516 A2 | 1/2002 |
| WO | WO 02/21464 A2 | 3/2002 |

* cited by examiner

METHOD AND APPARATUS FOR CASHLESS TRANSACTIONS VIA A TELECOMMUNICATIONS NETWORK This invention relates to a method and apparatus for cashless transactions, particularly but not exclusively payment for goods, via a telecommunications network.

There are many circumstances in which it may be desirable to be able to carry out a cashless transaction, for example, cashless payment for goods, e.g. food in fast-food restaurants. Various facilities for cashless payment already exist. For example, it is possible to pay for goods without cash using credit or debit cards, or direct debiting of the purchaser's bank account. However, such methods often use credit clearance houses which can levy a credit clearance charge, and, if the value of the transaction is low, e.g. less than £20, the proportion of such charges in relation to the value of the goods may become unacceptable to the retailer. It would therefore be preferable to have a cashless transaction service which avoids the use of such clearance houses.

In addition, present-day access to a telecommunications network via land lines or mobile phones is widespread. It would be desirable to be able to use a cashless transactions service via a telecommunications network.

According to a first aspect of the present invention there is provided a method of using a telecommunications network cashless transaction service comprising the steps of:

(i) a user accesses the service using a telecommunications network access instrument which produces a signal, (ii) the access instrument signal is forwarded to an interface device of the telecommunications network, (iii) the interface device extracts service identity and user identity data from the access instrument signal, (iv) the interface device passes the data to a processing unit for the service of the telecommunications network, (v) the service processing unit processes the data, (vi) the service processing unit instructs the interface device to forward the access instrument signal to an input output device of the telecommunications network, (vii) the service processing unit instructs the input output device to request details of the cashless transaction from the user, (viii) the transaction details are sent to the input output device, (ix) the input output device passes the transaction details to the service processing unit, (x) the service processing unit processes the details and decides whether or not the transaction can proceed, (xi) the service processing unit causes output of a signal conveying acceptance or rejection of the transaction to the user, and (xii) if the transaction can proceed, the service processing unit arranges for the transaction to be carried out.

The transaction preferably takes place in 'real-time', i.e. the time taken to complete the transaction is comparable to the time it would take to carry out the transaction using cash.

The telecommunications network may comprise one or more fixed networks, or may comprise one or more mobile networks, or may comprise a combination of one or more fixed networks and one or more mobile networks. The service may be provided on an intelligent network (IN) platform of the telecommunications network. The service may be provided as a third party application service provider (ASP) operation, i.e. the service may be provided on a server or a network managed by a third party and linked to the telecommunications network.

The telecommunications network access instrument signal may be forwarded to the interface device via the voice bearer channel of the telecommunications network, or one or more data bearer channels of the telecommunications network, or a combination of these channels. The telecommunications network access instrument may comprise, for example, a telephone, particularly a mobile telephone or a telephone connected to a land line, or may comprise a computer provided with a modem, or a personal digital assistant (PDA) organiser provided with a modem. The telecommunications network access instrument may comprise, for example, a computer or an integrated services digital network (ISDN) terminal.

The user may access the service by inputting into the telecommunications network access instrument a service identifier, e.g. a number, dedicated to the service. There may be more than one identifier dedicated to the service, for example depending on the vendor or type of transaction to be carried out. Preferably, however, there is only one identifier dedicated to the service no matter what the transaction or vendor to be used. The or each identifier dedicated to the service may provide access to the service, but not encode any information about the identity of the user or the transaction. When the access instrument comprises, for example, a telephone the or each identifier may comprise a number which, in turn may comprise a code which denotes a cashless transaction service. The or each number dedicated to the service may be owned by an operator of the telecommunications network. The or each number dedicated to the service may be a local rate, non-geographic number. Regardless of the method use to access the service, access is instigated by the user, and the real/perceived opportunities for fraud are thereby reduced.

The signal from the telecommunications network access instrument may be forwarded directly or indirectly to the interface device. In one embodiment, the telecommunications network comprises a fixed network and the access instrument signal is forwarded to the interface device via a mobile network, for example any of the commercially available mobile networks.

The interface device may comprise a service switching point (SSP), which may be a telephone exchange.

The service identity data extracted by the interface device may comprise a service identifier, e.g. a number, dedicated to the service used by the access instrument to access the service. Alternatively or additionally, the service identity data may comprise a service identifier key which is derived from the identifier dedicated to the service by the interface device. The user identity data extracted by the interface device may comprise a user identifier, e.g. a number, assigned to the telecommunications network access instrument. For example, when the access instrument comprises a telephone, the user identity data may comprise the number assigned to the telephone. The transaction to be carried out is thereby associated with a particular access instrument and user.

The service processing unit may comprise a service control point (SCP), which may comprise a computer running service software which defines the cashless transaction service.

Processing of the service identity and user identity data by the service processing unit may comprise using the data to identify the cashless transaction service to be used and running service software which causes this service to be carried out.

Instructing the interface device to forward the telecommunications network access instrument signal to the input output device may comprise the service processing unit sending a signal to the interface device which causes the interface device to forward the access instrument signal. Instruction of the interface device may be controlled by the service software.

The input output device may comprise an interactive/intelligent voice response (IVR) unit, which may comprise a computer with an interface for a telecommunications network access instrument, for example a telephony interface.

The interface device, service processing unit and input output device may be provided as separate modules, or two or more of these may be comprised in one module. For example, the interface device may be part of the service processing unit, or the input output device may be part of the interface device. The telecommunications network may comprise more than one interface device, service processing unit and input output device.

Instructing the input output device to request transaction details from the user may comprise instructing the input output device to request transaction details from the telecommunications network access instrument. This may comprise the service processing unit sending a signal to the input output device which causes the input output device to send a signal to the access instrument requesting the details. The service processing unit may also instruct the input output device to wait for a response. Instruction of the input output device may be controlled by the service software. The input output device may send the signal to the telecommunications network access instrument via the voice bearer channel of the telecommunications network, or via one or more data bearer channels of the telecommunications network, or via a combination of these channels. The signal may comprise an encoded message, requesting the transaction details. This may comprise an encoded audio, e.g. voice, message, or an encoded visual message. The communications network access instrument may send a signal to the user requesting the transaction details. The signal to the user may comprise, for example, an audio, e.g. voice, message, or a visual message requesting the transaction details. The signal to the user may further comprise a message welcoming the user to the service or conveying marketing information.

The transaction details may be sent to the input output device via the voice bearer channel of the telecommunications network (i.e. in the form of in-band signals), or one or more data bearer channels of the telecommunications network, or a combination of these channels. The in-band signals may comprise encoded digits such as tone dialling digits.

The transaction details may comprise, for example, vendor identification data such as the name of the vendor or a code associated with the vendor, vendor location data such as a code associated with a branch of the vendor and/or a point of sale (POS) device in the branch at which the transaction is to be carried out, and transaction data such as the amount of the transaction.

The transaction details may be sent to the input output device from one or more sources. At least some of the transaction details may be held by a POS device, and this may be used to send the details to the input output device. At least some of the transaction details may be held by the telecommunications network access instrument, and this may be used to send the details to the input output device. In this case, the transaction details can be automatically associated with the user as the access instrument signal contains user identity data. The transaction details may be sent to the input output device from an access instrument and a POS device.

The transaction details may be input into the telecommunications network access instrument in a number of different ways. For example, the user could enter the transaction details into the access instrument. When this comprises a telephone, the user could key the transaction details into the keypad of the telephone or could speak the transaction details into the telephone. These methods may, however, introduce unacceptable errors, particularly if the transaction details are long or complicated. A data input device may be used to input the transaction details into the access instrument. The data input device may, for example, use an audio signal or a visual signal or an infra red signal to input the transaction details into the access instrument. The data input device may comprise a POS device.

The data input device may comprise an audio coupler, which uses an audio signal to input the transaction details into the telecommunications network access instrument. The audio coupler may send the transaction details to the access instrument as a dual tone multi-frequency (DTMF) audio digital string signal. The audio coupler may comprise an audio generator, such as a speaker, for generating the audio signals for the transaction details. This may be connected to an amplifier and a tone generator. The tone generator may produce electrical signals encoding the transaction details for conversion into audio signals by the speaker. The audio generator may be acoustically connected to the access instrument by, for example, a link or by air.

The audio coupler may comprise a receiver unit, such as a cradle, which may receive the access instrument for inputting the transactions details into the access instrument. For example, the access instrument may comprise a mobile telephone and the audio coupler may comprise a cradle which receives the mobile telephone such that the coupler may output audio signals which are received by a microphone of the mobile telephone. The receiver unit is preferably configured to receive different types of access instrument, for example different types of telephones. The receiver unit may comprise an acoustically transparent mat on which the access instrument is placed. The mat may be provided with a target to indicate the preferred positioning of the access instrument thereon.

The audio coupler may comprise a memory and the transaction details or some of the transaction details, may be stored therein. For example the stored transaction details may comprise the identity of the vendor, the identity of the vendor's branch where the user wishes to carry out the transaction, the identity of a POS device in the branch at which the transaction is to be carried out and with which the coupler is associated. The coupler may be arranged such that the stored transaction details may be input and changed by authorisation of a representative of the vendor only. The transaction details or some of the transaction details, for example the amount of the transaction, may be entered into the audio coupler, which may comprise using input means. The audio coupler may append the entered transaction details to the transaction details stored in its memory for sending to the access instrument. The audio coupler may comprise a keypad, or may be connected to a stand-alone keypad, which may be used to enter at least some of the transaction details into the coupler. The coupler may comprise a bar code reader, or may be connected to a bar code reader, which may be used to enter at least some of the transaction details into the coupler. Such a coupler may be placed in the vicinity of a POS device at which the transaction is to be carried out. The audio coupler may comprise a POS device, or may be connected to a POS device, which may be used to enter at least some of the transaction details into the coupler. When the coupler is connected to a POS device, the POS device may send the transaction details to the coupler as audio signals generated by a speaker connected to a sound card. The audio signals may be sent as in-band signals. The coupler may comprise a microphone to receive the audio signals. The POS device may comprise software which contains or which derives the transaction details. The POS device may be a till or an electronic POS device such as a PC-based terminal.

The audio coupler may comprise at least one display unit. The transaction details or some of the transaction details, for example the amount of the transaction, may be shown on the display unit.

On receipt of the transaction details the service processing unit checks whether or not the transaction may proceed. This may comprise, for example, checking that the user may use the service, or checking that the user has sufficient funds to pay for the transaction, or checking that all the transaction details have been received, or a combination of these.

Causing an acceptance signal or rejection signal to be output to the user may comprise the service processing unit instructing the input output device to output an acceptance signal or rejection signal. This may comprise the service processing unit sending a signal to the input output device which causes it to generate and output the acceptance signal or rejection signal. Instruction of the input output device may be controlled by the service software. The input output device may output the acceptance signal or rejection signal via the voice bearer channel of the telecommunications network, or one or more data bearer channels of the telecommunications network, or a combination of these channels.

The input output device may send the acceptance signal or rejection signal to the telecommunications network access instrument, for output to the user. The access instrument may convert the acceptance signal or rejection signal to, for example, an audio signal, e.g. a tone or a voice message, or a visual signal, for output to the user. The acceptance signal may comprise the amount of the transaction. The access instrument may forward the acceptance signal or rejection signal to an audio coupler, for output to the user. The audio coupler may output the signal to the user as an audio signal via a speaker. The coupler may comprise an amplifier, which may be used to amplify the signal before output to the user. On hearing the acceptance signal or rejection signal, the user may disconnect the access instrument signal from the telecommunications network input output device. The acceptance signal or rejection signal may also be heard by a representative of the vendor, e.g. a cashier operating a POS device near which the coupler is positioned. On hearing the acceptance signal or rejection signal, the vendor's representative may proceed with the transaction or not as appropriate.

The input output device may send the acceptance signal or rejection signal to a display unit, for output to the user. The acceptance signal or rejection signal may comprise a calling line identification (CLI) presentation number which is displayed by the display unit, which may be a CLI display telephone. The display unit may be provided in the proximity of a POS device, at which the transaction is being carried out. The display unit may be incorporated into a POS device. The display unit may be incorporated into the coupler. On seeing the acceptance signal or rejection signal, the user may disconnect the access instrument signal from the telecommunications network input output device. The acceptance signal or rejection signal may also be seen by a representative of the vendor, e.g. a cashier operating a POS device at which the transaction is being carried out. On seeing the acceptance signal or rejection signal, the vendor's representative may proceed with the transaction or not as appropriate. The input output device may send the acceptance signal or rejection signal to a POS device, for output to the user.

Causing an acceptance signal or rejection signal to be output to the user may comprise the service processing unit instructing the interface device to output the acceptance signal or rejection signal. This may comprise sending a signal to the interface device which causes it to generate and output the acceptance signal or rejection signal. Instruction of the interface device may be controlled by the service software. The interface device may output the acceptance signal or rejection signal via the voice bearer channel of the telecommunications network, or one or more data bearer channels of the telecommunications network, or a combination of these channels. The interface device may send the acceptance signal or rejection signal to the telecommunications network access instrument for output to the user. The interface device may send the acceptance signal or rejection signal to a POS device, for output to the user. The acceptance signal or rejection signal may be sent to the POS device using the telecommunications network access instrument signal, which is disconnected from the input output device and connected to the POS device via the interface device. The service processing unit may instruct the interface device to disconnect the access instrument signal from the input output device and to connect it to the POS device. Instruction of the interface device may be controlled by the service software. When the access instrument signal comprises a telephony signal, the POS device may comprise a telephony access point, e.g. a modem, for connection of the telephony signal thereto. The service processing unit may derive the number of the POS device telephony access point from the transaction details, for connection of the telephony signal. The acceptance signal may comprise the amount of the transaction. The acceptance signal or rejection signal may comprise a CLI presentation number. The acceptance CLI presentation number may comprise the amount of the transaction. Having the acceptance signal comprise the amount of the transaction allows the user, or a representative of the vendor, to know the amount of the transaction received by the service processing unit and to check that this is the same as the amount sent to the input output device. The POS device may output the acceptance signal or rejection signal, particularly a CLI presentation number, as a visual signal using a display unit of the POS device or connected to the POS device, e.g. a CLI display telephone. The POS device may comprise software to display the CLI presentation number. The POS device may output the acceptance signal or rejection signal as an audio signal, using a sound card connected to a speaker in the POS device, or connected to a microphone and a speaker of a stand alone audio coupler. On receiving an acceptance signal, the POS device may send a signal to the service processing unit confirming that the transaction may proceed. The confirmation signal may be launched by the POS device answering the access instrument signal. This may be initiated by the user or by a representative of the vendor, e.g. a cashier operating the POS device. On confirmation of the transaction, the vendor's representative may proceed with the transaction. On receiving the acceptance signal or rejection signal or on confirmation of the transaction, the user may disconnect the access instrument signal from the interface device and POS device. The POS device may record that the transaction has taken place.

Causing an acceptance signal or rejection signal to be output to the user may comprise the service processing unit sending the acceptance signal or rejection signal to the user. This may comprise using a telecommunications network link or data link, such as a WAN/LAN link or data link. This may be controlled by the service software. The link may be provided between the service processing unit and, for example the telecommunications access instrument or a POS device. Only one connection to a vendor branch may then be needed, with all POS devices therein being connected thereto. The service processing unit may derive data identifying the link from the transaction details. The acceptance signal may comprise the amount of the transaction. Having the acceptance signal comprise the amount of the transaction allows the user, or a representative of the vendor, to know the amount of the transaction received by the service processing unit and to check that this is the same as the amount sent to the input output device. On outputting the acceptance/rejection signal via the link, the service processing unit may also instruct the interface device to disconnect the access instrument signal from the input output device. Instruction of the input output device may be controlled by the service software. The POS device may output the acceptance signal or rejection signal as a visual signal, using a display unit of the POS device or connected to the POS device. The POS device may output the acceptance signal or rejection signal as an audio signal, using a sound card connected to a speaker in the POS device, or connected to a microphone and a speaker of a stand alone audio coupler. On receiving an acceptance signal, the POS device may send a signal to the service processing unit confirming that the transaction may proceed. This may be sent via the link, and may be initiated by the user or by a representative of the vendor, e.g. a cashier operating the POS device. On confirmation of the transaction, the vendor's representative may proceed with the transaction. The POS device may record that the transaction has taken place. The link may also be used to send some of the transaction details to the service processing unit.

The input output device may also output an acceptance/rejection signal to a representative of the vendor. This may be the same acceptance/rejection signal output to the user, or may be a separate acceptance/rejection signal.

The service processing unit may record the transaction details and the service identity and user identity data for each transaction. For the transaction to be carried out, the service processing unit may send the transaction details and the service identity and user identity data to a billing service. The billing service may be operated by an operator of the telecommunications network. The billing service may use the transaction details and the identity data to debit the amount of the transaction from the user, and to credit the vendor etc. For example, the amount of the transaction may be split between the vendor, an operator of the telecommunications network, and a supplier of the telecommunications network, as previously agreed between them. The billing service may use an accounts system to carry out the transaction. This may comprise an existing accounts system used in the telecommunications network. The billing service may link to one or more databases, e.g. a vendor database and/or a user database, to carry out the transaction.

To use the cashless transaction service, the user may be provided with an account, which may be debited (or credited) on carrying out of a transaction using the service. Before use of the service, the user may first register with the service to be provided with an account. Provision of the account may be accompanied with an introductory offer, for example crediting the account with a specified amount. The account may be separate from any, for example, accounts of mobile or land line telephones which also use the telecommunications network. The user may specify that one or more access instruments may be used with the account, for example one or more mobile telephones may be used to carry out transactions using the same account, regardless of the mobile network on which they operate. The user may specify that the amount of any transaction carried out using the account be limited. The user's account can be dedicated to one or more vendors. The account may be a pre-pay account, i.e. sufficient funds must be present in the account before a transaction using the account can be carried out. The funds can be transferred to the pre-pay account using, for example, a direct debit facility from a bank account of the user, or by the user purchasing vouchers. The account may be a post-pay account, i.e. the user may carry out transactions without there being sufficient funds in the account. The account may be settled by billing the user, for example using an existing billing system for the user on the telecommunications network, or by using a direct debit facility from a bank account of the user. The post-pay account may be allocated a credit limit, which, when reached, prevents further transactions being carried out until the account is fully or partially settled. The user's account is preferably debited in real-time, i.e. as the transaction is carried out or shortly thereafter.

Alternatively, the transaction could be carried out by debiting an existing account of the user, e.g. a mobile telephone account or a land line/fixed network telephone account, which uses the telecommunications network. To use the service, the user need not first register with the service to receive an account.

The user may be required to use a security code for authorisation of a transaction, without which the transaction cannot proceed. This provides a more secure service, reducing the opportunities for fraud. The security code may comprise, for example, one or more numbers, e.g. a personal identification number (PIN), or one or more letters or words, or voice recognition of the user. The input output device may send a message to the user requesting the security code. The security code may be sent to the input output device. The security code may be sent to the input output device, via the voice bearer channel of the telecommunications network, or one or more data bearer channels of the telecommunications network, or a combination of these channels. The security code may be input into the telecommunications network access instrument for sending to the input output device. For example, when the access instrument comprises a telephone, the security code may be spoken into the telephone or may be keyed into the keypad of the telephone. This could be locked by the user when not in use to provide extra security to the service. The security code may be input into an audio coupler for sending to the telecommunications network access instrument and on to the input output device. For example, the security code may be spoken into the speaker of the coupler or may be keyed into the keypad of the coupler. The security code may be input into a POS device for sending to the input output device. On receipt of the security code, the input output device may send it to the service processing unit, separately from or together with the transaction details. The service processing unit may use the security code to decide whether or not the transaction may proceed.

According to a second aspect of the present invention there is provided a telecommunications network providing a cashless transaction service comprising:

an interface device, a service processing unit, and an input output device, in which the interface device accepts a signal from a telecommunications network access instrument, extracts service identity and user identity data from the access instrument signal, and passes the data to the service processing unit, the service processing unit processes the data, instructs the interface device to forward the access instrument signal to the input output device, and instructs the input output device to request details of the cashless transaction, the input output device receives the transaction details, and passes them to the service processing unit, and the service processing unit processes the details and decides whether or not the transaction can proceed, causes output of a signal conveying acceptance or rejection of the transaction, and, if the transaction can proceed, arranges for the transaction to be carried out.

The telecommunications network may comprise one or more fixed networks, or may comprise one or more mobile networks, or may comprise a combination of one or more fixed networks and one or more mobile networks. The service may be provided on an intelligent network (IN) platform of the telecommunications network. The service may be provided as a third party application service provider (ASP) operation, i.e. the service may be provided on a server or a network managed by a third party and linked to the telecommunications network.

The interface device may comprise a service switching point (SSP), which may be a telephone exchange. The service processing unit may comprise a service control point (SCP), which may comprise a computer running service software which defines the cashless transaction service. The input output device may comprise an interactive/intelligent voice response (IVR) unit, which may comprise a computer with an interface for a telecommunications network access instrument, for example a telephony interface. The interface device, service processing unit and input output device may be provided as separate modules, or two or more of these may be comprised in one module. For example, the interface device may be part of the service processing unit, or the input output device may be part of the interface device. The telecommunications network may comprise more than one interface device, service processing unit, and input output device.

According to a third aspect of the present invention there is provided a cashless transaction service adapted to be provided on a telecommunications network comprising:

means for extracting service identity and user identity data from a signal from a telecommunications network access instrument, means for processing the data, meals for instructing an interface device of the telecommunications network to forward the access instrument signal to an input output device of the telecommunications network, means for instructing the input output device to request details of the cashless transaction, means for processing the transaction details and deciding whether or not the transaction can proceed, means for causing output of a signal conveying acceptance or rejection of the transaction, and if the transaction can proceed, means for arranging for the transaction to be carried out.

The service may be provided as software which may be held on a service processing unit of the telecommunications network, such as an SCP.

According to a fourth aspect of the present invention there is provided an audio coupler for use with any of the first three aspects of the invention, comprising:

an audio generator arranged to generate audio signals that incorporate transaction details, a receiver unit arranged to receive a telecommunications access instrument, the receiver unit also being arranged to input the transactions details into the access instrument, a memory arranged to store at least some of the transaction details therein, and input means arranged to receive at least some of the transaction details into the audio coupler.

The audio generator may be a speaker. This may be connected to an amplifier and a tone generator. The tone generator may produce electrical signals for conversion into audio signals by audio generator. The audio generator may be acoustically connected to the access instrument by, for example, a link or by air.

The receiver unit may comprise a cradle. The access instrument may comprise a mobile telephone and the audio coupler may comprise a cradle which receives the mobile telephone such that the coupler may output audio signals which are received by a microphone of the mobile telephone. The cradle is preferably configured to receive different types of access instrument, for example different types of telephones. The cradle may comprise an acoustically transparent mat on which the access instrument is placed. The mat may be provided with a target to indicate the preferred positioning of the access instrument thereon.

The stored transaction details may comprise the identity of the vendor, the identity of the vendor's branch where the user wishes to carry out the transaction, the identity of a POS device in the branch at which the transaction is to be carried out and with which the coupler is associated. The coupler may be arranged such that the stored transaction details may be input and changed by authorisation of a representative of the vendor only.

The audio coupler may append the entered transaction details to the transaction details stored in its memory. The input means may comprise a keypad, or a connection to a stand-alone keypad. The input means may comprise a bar code reader, or a connection to a bar code reader. The input means may comprise a POS device, or a connection to a POS device.

The audio coupler may comprise at least one display unit. The transaction details or some of the transaction details, for example the amount of the transaction, may be shown on the display unit.

Embodiments of the present invention will now be described by way of example only, with reference to the following diagrams in which.

Before the cashless transaction service can be used, a user first contacts the service provider and requests access to the service. Various details are requested from the user, for example identification and credit information, and a pre-pay or a post-pay account is set up. A PIN is also assigned to the user, who may then access the service. There will now be described four systems and methods of carrying out a cashless transaction using the service.

Figure 1:
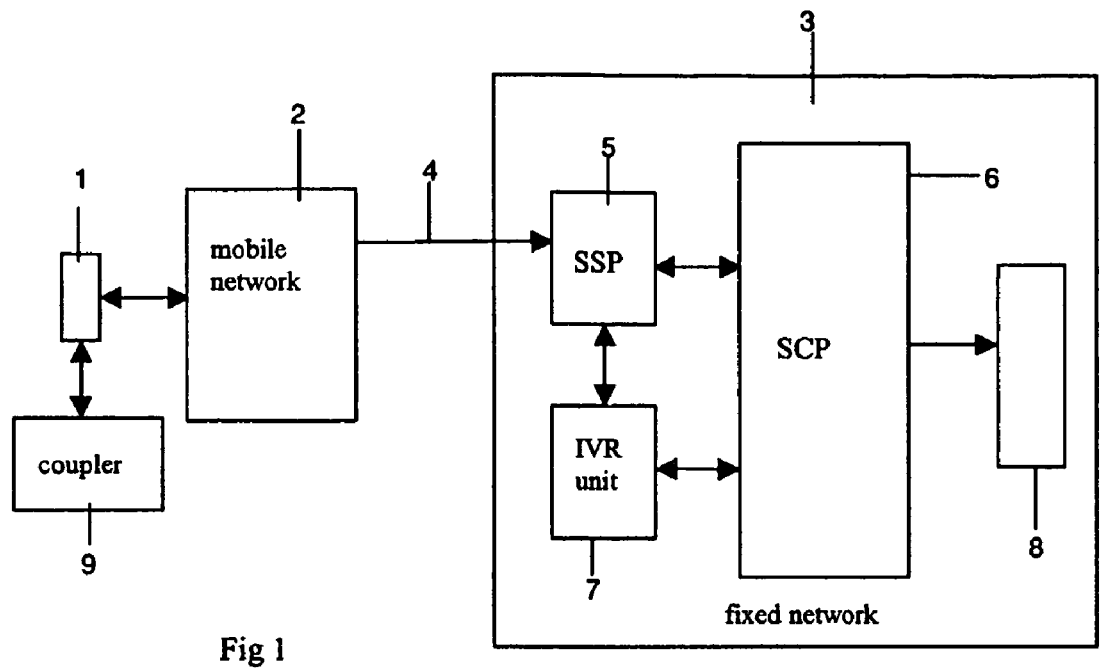
FIG. 1 is a schematic diagram of a first embodiment of a telecommunications network according to the second aspect of the present invention.

In FIG. 1, a user uses a mobile telephone 1 to connect to a mobile telecommunications network 2, which in turn connects to a fixed telecommunications network 3 via an interface 4. The fixed telecommunications network comprises an interface device, an SSP 5, a service processing unit, an SCP 6, an input output device, an IVR unit 7, and a billing service unit 8. The mobile telephone 1 is further connected to an audio coupler 9. In this embodiment it is assumed that the user is in a branch of the vendor, and the coupler is provided in the vicinity of a POS device such as a till, at which the transaction is to be carried out. The branch may be a fast-food restaurant and the transaction may comprise purchasing food.

To carry out a cashless transaction, the user first uses the mobile telephone 1 to dial a telephone number dedicated to the service. This may be displayed in the proximity of the till, or saved on the mobile telephone. The mobile telephone 1 produces a signal, i.e. a telephone call, which it connects to the mobile network 2. The call is forwarded by the mobile network 2 to the fixed network 3 via the interface 4. The call is received from the interface 4 by the SSP 5 of the fixed network 3. The SSP 5 extracts the telephone number of the service, the telephone number of the mobile telephone 1 and derives a service identifier key from the call and passes this data to the SCP 6. The SCP 6 processes this data using service software which defines the operation of the service. The SCP 6 instructs the SSP 5 to connect the call to the IVR unit 7, and the SSP 5 forwards the call to the IVR unit 7. The SCP 6 then instructs the IVR unit 7 to request details of the transaction from the mobile telephone 1. The IVR unit 7 sends a signal to the mobile telephone 1 via the SSP 5 which causes it to output an audio message to the user requesting the transaction details. The user places the mobile telephone 1 on a cradle of the audio coupler 9, such that the mobile telephone 1 and coupler 9 are acoustically connected. The details of the vendor, the branch and the till at which the transaction is being carried out are stored in a memory of the coupler 9. A cashier operating the till enters the amount of the transaction into a keypad of the coupler 9, and presses a 'send' button on the keypad to initiate output of the transaction details. The amount of the transaction is displayed by the coupler 9, for the user and cashier to see. The coupler 9 outputs an audio signal comprising all of these transaction details which is received by a microphone of the mobile telephone 1. The cashier hears the transaction details being sent to the mobile telephone 1, and requests the user to enter a PIN for the service. The user enters the PIN into the keypad of the coupler 9, and the coupler 9 outputs an audio signal comprising the PIN which is received by the mobile telephone 1. The mobile telephone 1 then sends the transaction details and the PIN to the IVR unit 7 of the fixed network 3 via the mobile network 2, the interface 4 and the SSP 5. The IVR 7 forwards the transaction details and the PIN to the SCP 6, which uses the service software to process the data and to decide whether or not the transaction can proceed. If the transaction cannot take place, for example because the user is not registered with the service, the SCP 6 instructs the IVR unit 7 to send a rejection signal to the mobile telephone 1. The mobile telephone 1 sends the rejection signal to the audio coupler 9 which amplifies it and outputs it as an audio tone. When this is heard by the user and cashier the transaction is abandoned. The transaction may then be attempted again, if desired. If the transaction can proceed, the SCP 6 instructs the IVR unit 7 to send an acceptance signal to the mobile telephone 1. The mobile telephone 1 sends the acceptance signal to the audio coupler 9 which amplifies the signal and outputs it as an audio tone (different to the rejection tone). When this is heard by the user and cashier the transaction proceeds, e.g. the cashier releases the goods, and the user clears the call from the mobile telephone 1. The SCP 6 then arranges for the transaction to be carried out by sending the transaction details and the service identity and user identity data to the billing service unit 8, which debits the user's account and credits the vendor, telecommunications network operator etc.

Figure 2:
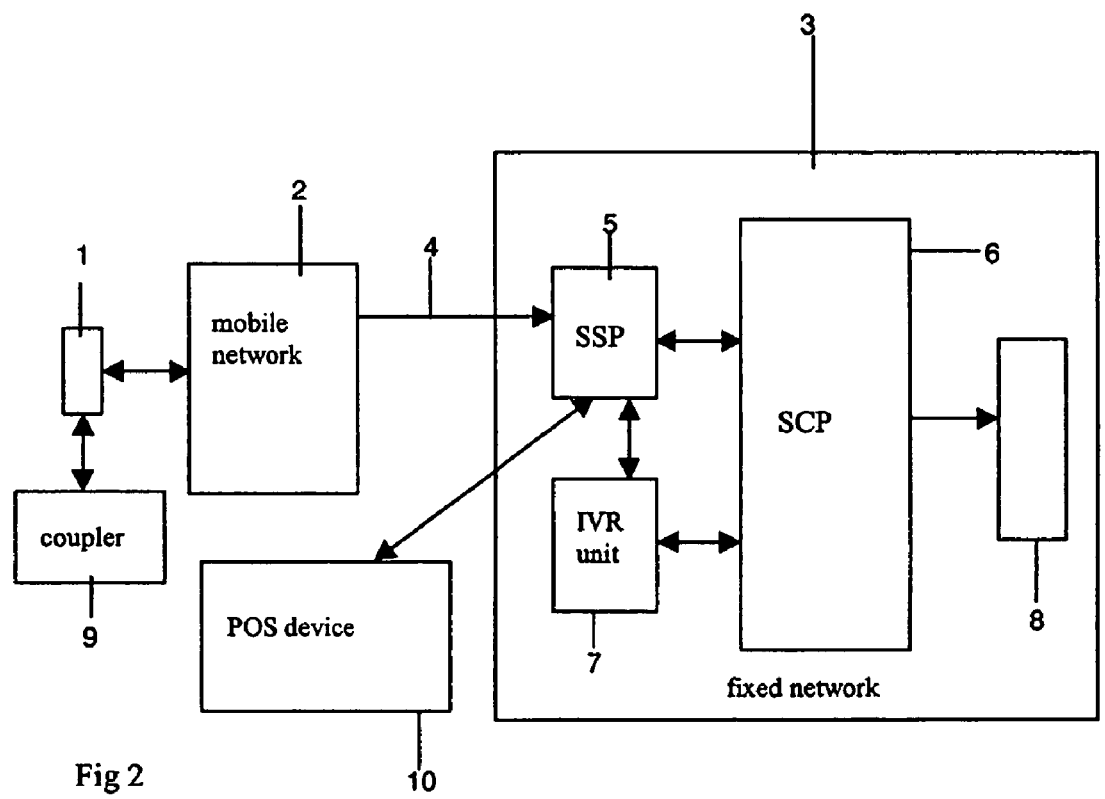
FIG. 2 is a schematic diagram of a second embodiment of a telecommunications network according to the second aspect of the present invention.

FIG. 2 shows a second embodiment of the present invention. This is similar to the first embodiment, and where appropriate like reference numbers have been used for like features.

As before, a user uses a mobile telephone 1 to connect to a mobile telecommunications network 2, which in turn connects to a fixed telecommunications network 3 via an interface 4. The fixed telecommunications network 3 comprises an interface device, an SSP 5, a service processing unit, an SCP 6, an input output device, an IVR unit 7, and a billing service unit 8. The mobile telephone 1 is further connected to an audio coupler 9. In this embodiment it is again assumed that the user is in a branch of the vendor, and the coupler is provided in the vicinity of a POS device such as a till 10 at which the transaction is to be carried out. The till 10 possesses a telephony access point, and a telephony link is provided between the till 10 and the SSP 5 of the fixed network 3. To carry out a cashless transaction, the user first uses the mobile telephone 1 to dial a telephone number dedicated to the service. The mobile telephone 1 produces a signal, i.e. a telephone call, which it connects to the mobile network 2. The call is forwarded by the mobile network 2 to the fixed network 3 via the interface 4. The call is received from the interface 4 by the SSP 5 of the fixed network 3. The SSP 5 extracts the telephone number of the service, the telephone number of the mobile telephone 1 and derives a service identifier key from the call and passes this data to the SCP 6. The SCP 6 processes this data using service software which defines the operation of the service. The SCP 6 instructs the SSP 5 to connect the call to the IVR unit 7, and the SSP 5 forwards the call to the IVR unit 7. The SCP 6 then instructs the IVR unit 7 to request details of the transaction from the mobile telephone 1. The IVR unit 7 sends a signal to the mobile telephone 1 which causes it to output an audio message to the user requesting the transaction details. The user places the mobile telephone 1 on a cradle of the audio coupler 9, such that the mobile telephone 1 and coupler 9 are acoustically connected. The details of the vendor, the branch and the till at which the transaction is being carried out are stored in the coupler 9. A cashier operating the till enters the amount of the transaction into a keypad of the coupler 9. The coupler 9 outputs an audio signal comprising all of these transaction details which is received by a microphone of the mobile telephone 1. The mobile telephone 1 forwards these transaction details to the IVR unit 7 via the mobile network 2, interface 4 and SSP 5, and the IVR unit 7 forwards these to the SCP 6. The user removes the mobile telephone 1 from the cradle of the coupler 9. The IVR unit 7 receives the transaction details, and sends a signal to the mobile telephone 1 which causes it to output an audio message announcing the amount of the transaction and requesting the user to accept this amount and authorise the transaction by entering a PIN for the service. The user enters the PIN into the keypad of the mobile telephone 1, thereby accepting the displayed transaction amount and allowing the transaction to proceed. The mobile telephone 1 then sends the PIN to the IVR unit 7 of the fixed network 3 via the mobile network 2, the interface 4 and the SSP 5. The IVR unit 7 forwards the PIN to the SCP 6, which uses the service software to process the data and to decide whether or not the transaction can proceed. The SCP 6 derives the telephone number of the telephony access point of the till 10 from the transaction details, and instructs the SSP 5 to clear the call from the IVR unit 7 and to forward it to the till 10. If the transaction cannot take place, for example because the user is not registered with the service, the SCP 6 instructs the SSP 5 to send a rejection signal to the till 10, using the mobile telephone call. When this is received by the cashier the transaction is abandoned. The transaction may be attempted again, if desired. If the transaction can proceed, the SCP 6 instructs the SSP 5 to send an acceptance signal to the till 10. This comprises the amount of the transaction as a CLI presentation number which is displayed by the till 10. When this is seen by the cashier the cashier answers the call to accept the transaction, and the transaction proceeds and the user clears the call from the mobile telephone 1. The acceptance is transferred to the SCP 6, which arranges for the transaction to be carried out by sending the transaction details and the service identity and user identity data to the billing service unit 8, which debits the user's account and credits the vendor etc.

Figure 3:
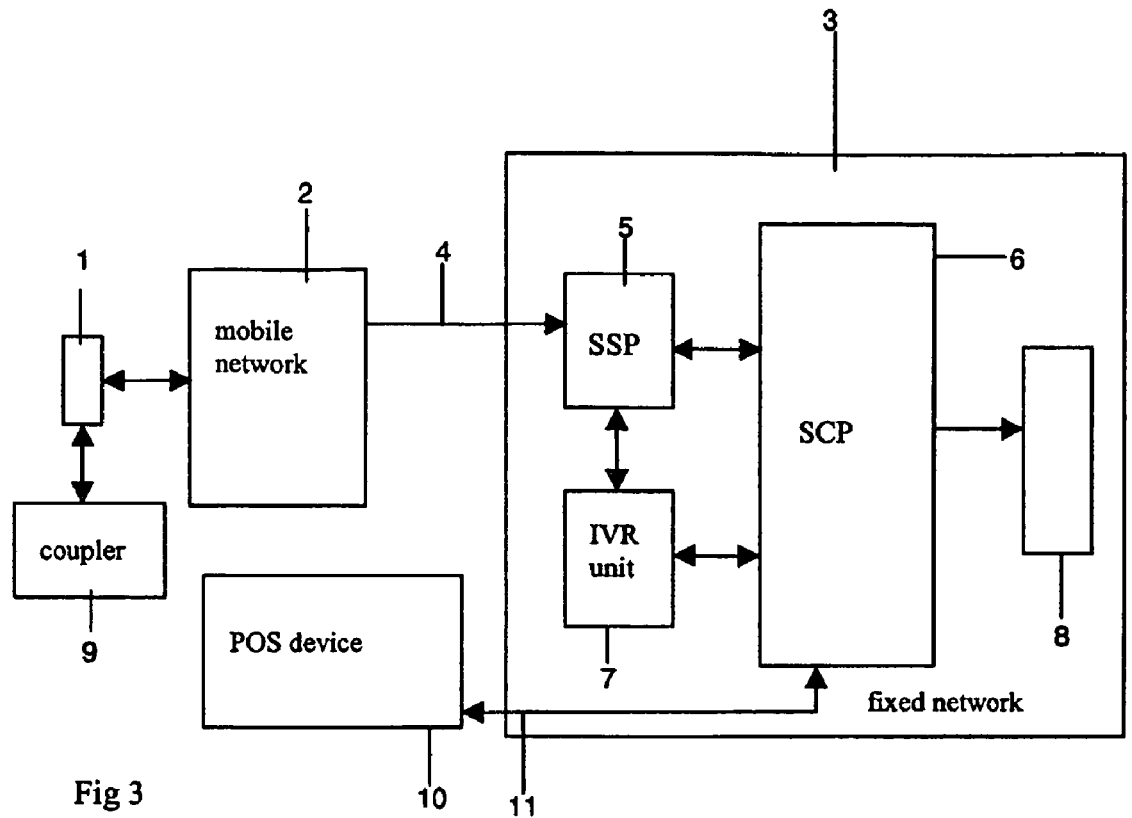
FIG. 3 is a schematic diagram of a third embodiment of a telecommunications network according to the second aspect of the present invention.

FIG. 3 shows a further embodiment of the present invention. Again, like numbers have been used for like features. A user uses a mobile telephone 1 to connect to a mobile telecommunications network 2, which in turn connects to a fixed telecommunications network 3 via an interface 4. The fixed telecommunications network 3 comprises an interface device, an SSP 5, a service processing unit, an SCP 6, an input output device, an IVR unit 7, and a billing service unit 8. The mobile telephone 1 is further connected to an audio coupler 9. In this embodiment it is assumed that the user is in a branch of the vendor, and the coupler is provided in the vicinity of a POS device such as a till 10 at which the transaction is to be carried out. A WAN link 11 is provided between the till 10 and the SCP 6 of the fixed network 3. To carry out a cashless transaction, the user first uses the mobile telephone 1 to dial a telephone number dedicated to the service. The mobile telephone 1 produces a signal, i.e. a telephone call, which it connects to the mobile network 2. The call is forwarded by the mobile network 2 to the fixed network 3 via the interface 4. The call is received from the interface 4 by the SSP 5 of the fixed network 3. The SSP 5 extracts the telephone number of the service, the telephone number of the mobile telephone 1 and derives a service identifier key from the call and passes this data to the SCP 6. The SCP 6 processes this data using service software which defines the operation of the service. The SCP 6 instructs the SSP 5 to connect the call to the IVR unit 7, and the SSP 5 forwards the call to the IVR unit 7. The SCP 6 then instructs the IVR unit 7 to request details of the transaction from the mobile telephone 1. The IVR 7 sends a signal to the mobile telephone 1 which causes it to output an audio message to the user requesting the transaction details. The user places the mobile telephone 1 on a cradle of the audio coupler 9, such that the mobile telephone 1 and coupler 9 are acoustically connected. The details of the vendor, the branch and the till at which the transaction is being carried out are stored in the coupler 9. A cashier operating the till enters the amount of the transaction into a keypad of the coupler 9. The coupler 9 outputs an audio signal comprising all of these transaction details which is received by a microphone of the mobile telephone 1. The cashier hears the transaction details being sent to the mobile phone 1, and requests the user to enter a PIN for the service. The user enters the PIN into the keypad of the coupler 9, and the coupler 9 outputs an audio signal comprising the PIN which is received by the mobile telephone 1. The mobile telephone 1 then sends the transaction details and the PIN to the IVR unit 7 of the fixed network 3 via the mobile network 2, the interface 4 and the SSP 5. The IVR unit 7 forwards the transaction details and the PIN to the SCP 6, which uses the service software to process the data and to decide whether or not the transaction can proceed. If the transaction cannot take place, for example because the user is not registered with the service, the SCP 6 sends a rejection signal to the till 10 via the WAN link 11 and instructs the SSP 5 to clear the call from the mobile telephone 1. The cashier communicates the rejection to the user and the transaction is abandoned. The transaction may be attempted again, if desired. If the transaction can proceed, the SCP 6 sends an acceptance signal comprising the amount of the transaction to the till 10 via the WAN link 11 and instructs the SSP 5 to clear the call from the mobile telephone 1. The acceptance signal is displayed by the till 10. When the acceptance signal is received by the cashier, the cashier replies thereby authorising the transaction and the transaction proceeds. The reply is sent to the SCP 6, which arranges for the transaction to be carried out by sending the transaction details and the service identity and user identity to the billing service unit 8, which debits the user's account and credits the vendor etc.

Figure 4:
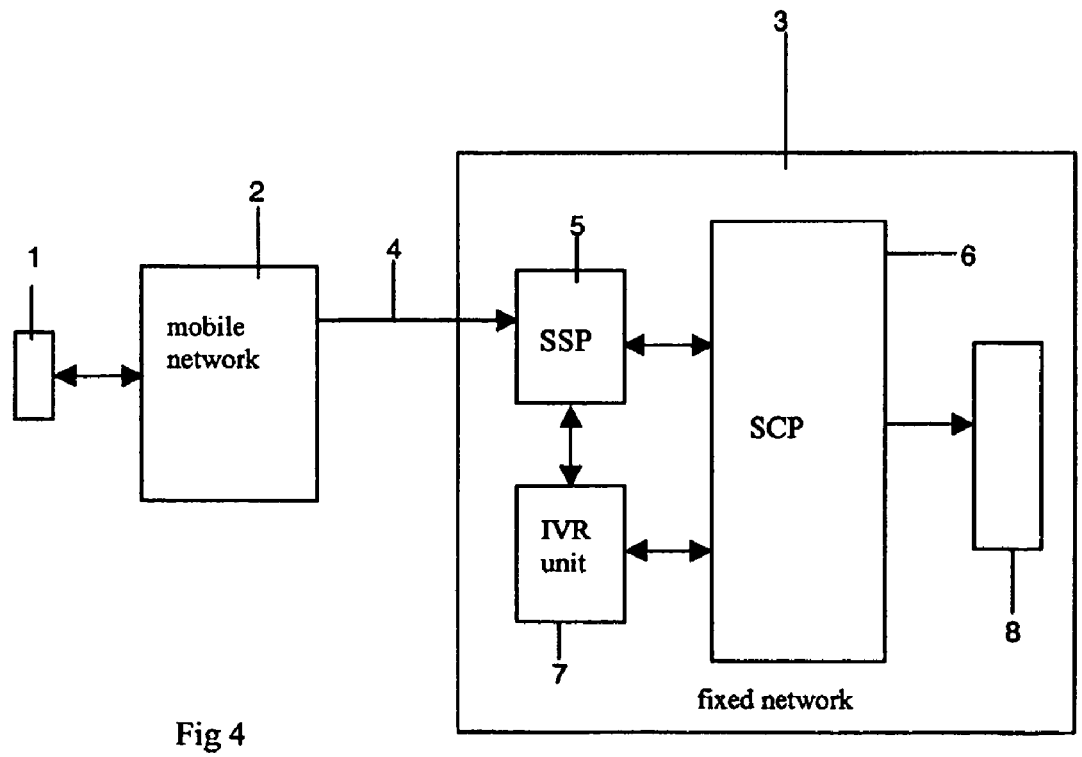
FIG. 4 is a schematic diagram of a fourth embodiment of a telecommunications network according to the second aspect of the present invention.

FIG. 4 shows an embodiment of the telecommunications network which can be used to carry out a cashless transaction when the user is not in a branch of the vendor. This embodiment of the service may be used, for example, to order goods, such as tickets or food, to be subsequently delivered to the user. Again, like reference numerals have been used to describe like features. The user uses a mobile telephone 1 to connect to a mobile telecommunications network 2, which in turn connects to a fixed telecommunications network 3 via an interface 4. The fixed telecommunications network 3 comprises an SSP 5, a SCP 6, an IVR unit 7 and a billing service unit 8. The mobile telephone 1 is not connected to an audio coupler. To carry out a cashless transaction, the user first uses the mobile telephone 1 to dial a telephone number dedicated to the service. The mobile telephone 1 produces a signal, i.e. a telephone call, which it connects to the mobile network 2. The call is forwarded by the mobile network 2 to the fixed network 3 via the interface 4. The call is received from the interface 4 by the SSP 5 of the fixed network 3. The SSP 5 extracts the telephone number of the service, the telephone number of the mobile telephone 1 and derives a service identifier key from the call and passes this data to the SCP 6. The SCP 6 processes this data using service software which defines the operation of the service. The SCP 6 instructs the SSP 5 to connect the call to the IVR unit 7, and the SSP 5 forwards the call to the IVR unit 7. The SCP 6 then instructs the IVR unit 7 to request details of the transaction from the mobile telephone 1. The IVR unit 7 sends a signal to the mobile telephone 1 which causes it to output an audio message to the user requesting the transaction details. The user enters the transaction details using the keypad of the mobile telephone 1 or by speaking into the microphone of the mobile telephone 1. The mobile telephone 1 sends the transaction details to the IVR unit 7 via the mobile network 3, and the IVR unit 7 requests the user to enter a PIN for the service. The user enters the PIN into the keypad or the microphone of the mobile telephone 1, and this is sent to the IVR unit 7. The IVR unit 7 forwards the transaction details and the PIN to the SCP 6, which uses the service software to process the data and to decide whether or not the transaction can proceed. If the transaction cannot take place the SCP 6 instructs the IVR unit 7 to send a rejection signal to the mobile telephone 1, and the transaction is abandoned. If the transaction can proceed, the SCP 6 instructs the IVR unit 7 to send an acceptance signal to the mobile telephone 1, and the transaction proceeds and the user clears the call from the mobile telephone 1. The SCP 6 then arranges for the transaction to be carried out by sending the transaction details and the service identity and user identity data to the billing service unit 8, which debits the user's account and credits the vendor, and instructs the vendor to carry out the transaction, e.g. to release goods to the user.

It will be appreciated that the above embodiments are only examples of carrying out the service of the present invention. Other embodiments may be envisaged. For example, the embodiment of FIG. 4 could be modified to use a telephone connected to a land line to connect to the fixed network. A mobile network need not then be used.

Figure 5:
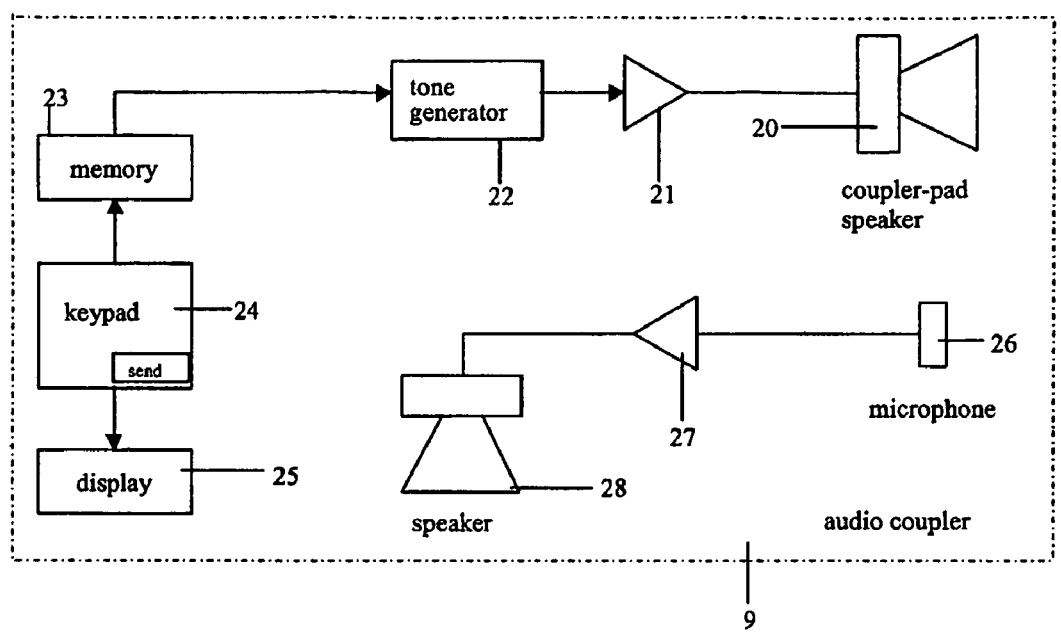
FIG. 5 is a schematic diagram of a coupler capable of use in the telecommunications networks of FIGS. 1 to 3.

FIG. 5 shows a schematic diagram of an audio coupler 9 which can be used with the telecommunications networks of FIGS. 1 to 3. This comprises a coupler-pad speaker 20 for generating the audio signals for the transaction details and outputting these to the mobile telephone (not shown). The speaker 20 is acoustically connected to the mobile telephone by air. The audio coupler further comprises a cradle (not shown), which receives the mobile telephone such that the audio signals from the coupler are received by a microphone of the mobile telephone. The cradle comprises an acoustically transparent mat on which the mobile telephone is placed and which houses the coupler-pad speaker 20. The mat is provided with a target to indicate the preferred positioning of the mobile telephone thereon.

The audio coupler 10 also comprises an amplifier 21 and a tone generator 22, connected to the speaker 20 as shown. The tone generator 22 receives the transaction details as a digital signal and converts this to an analogue signal which is amplified by the amplifier 21 and fed to the speaker 20 for conversion to an audio signal and output to the mobile telephone. The tone generator 22 receives the transaction details from a memory 23, which stores the identity of the vendor, the identity of the vendor's branch, and the identity of the POS device at which the transaction is to be carried out and with which the coupler is associated. The remaining transaction detail, i.e. the amount of the transaction, is entered into the audio coupler using a keypad 24 connected to the memory 23. The entered transaction detail is appended to the stored transaction details for sending to the tone generator 22. A display unit 25 is also provided, for displaying the amount of the transaction. The keypad 24 is also used for entry of the PIN of the user.

The audio coupler 10 also comprises a microphone 26, an amplifier 27 and a speaker 28. The microphone 26 is housed in the mat of the cradle, such that it is acoustically connected to the speaker of the mobile telephone. The microphone 26 receives acceptance/rejection signals from the mobile telephone, and passes these to the amplifier 27 where they are amplified and passed to the speaker 28 for output to the user and cashier.

The invention claimed is:

1. A method of using a telecommunications network cashless transaction service, comprising the steps of:
   a) accessing the service by a user using a telecommunications network access instrument which produces a signal,
   b) forwarding the access instrument signal to an interface device of the telecommunications network,
   c) extracting service identity and user identity data from the access instrument signal by operation of the interface device,
   d) passing the data to a processing unit for the service of the telecommunications network by operation of the interface device,
   e) processing the data by operation of the service processing unit,
   f) instructing the interface device to forward the access instrument signal to an input output device of the telecommunications network by operation of the service processing unit,
   g) instructing the input output device to request details of a cashless transaction from the user by operation of the service processing unit,
   h) sending transaction details to the input output device using the telecommunications network access instrument, the transaction details comprising vendor identification data, including the vendor or a code associated with the vendor, and vendor location data including a code associated with a branch of the vendor and/or a point of sale (POS) device in the branch at which the transaction is to be carried out, at least some of the transaction details being held by the POS device, said at least some of the transaction details being sent to the input output device,
   i) passing the transaction details to the service processing unit by operation of the input output device,
   j) processing the transaction details and deciding whether or not the transaction can proceed by operation of the service processing unit,
   k) causing output of a signal conveying acceptance or rejection of the transaction to the user by operation of the service processing unit, and
   l) if the transaction can proceed, arranging for the transaction to be carried out by operation of the service processing unit.

2. The method according to claim 1, in which the telecommunications network comprises at least one of a fixed and a mobile network.

3. The method according to claim 1, and forwarding the telecommunications network access instrument signal to the interface device via a voice bearer channel of the telecommunications network.

4. The method according to claim 1, and forwarding the telecommunications network access instrument signal to the interface device via at least one data bearer channel of the telecommunications network.

5. The method according to claim 1, in which the telecommunications network access instrument comprises a telephone.

6. The method according to claim 1, in which the interface device comprises a service switching point (SSP).

7. The method according to claim 1, in which the user identity data extracted by the interface device comprises a user identifier assigned to the telecommunications network access instrument.

8. The method according to claim 1, in which the service processing unit comprises a service control point (SCP).

9. The method according to claim 1, in which processing of the service identity and user identity data by the service processing unit comprises using the data to identify the cashless transaction service to be used and running service software which causes this service to be carried out.

10. The method according to claim 1, in which the input output device comprises an interactive/intelligent voice response (IVR) unit.

11. The method according to claim 1, in which the input output device requests transaction details from the user by sending a signal to the telecommunications network access instrument requesting the transaction details.

12. The method according to claim 11, in which the input output device sends the signal to the access instrument via a voice bearer channel of the telecommunications network.

13. The method according to claim 11, in which the input output device sends the signal to the access instrument via at least one data bearer channel of the telecommunications network.

14. The method according to claim 1, in which the transaction details are sent to the input output device via a voice bearer channel of the telecommunications network.

15. The method according to claim 1, in which the transaction details are sent to the input output device via at least one data bearer channel of the telecommunications network.

16. The method according to claim 1, in which the transaction details comprise transaction data including an amount of the transaction.

17. The method according to claim 1, in which at least some of the transaction details are held by the telecommunications network access instrument, and this is used to send the transaction details to the input output device.

18. The method according to claim 17, in which a data input device is used to input the transaction details into the access instrument.

19. The method according to claim 18, in which the data input device comprises an audio coupler which uses an audio signal to input the transaction details into the access instrument.

20. The method according to claim 19, in which the audio coupler comprises a memory and at least some of the transaction details are stored therein.

21. The method according to claim 20, in which the at least some transaction details are entered into the audio coupler, which comprises using input means.

22. The method according to claim 21, in which the audio coupler comprises a keypad, which is used to enter the at least some transaction details into the audio coupler.

23. The method according to claim 21, in which the audio coupler comprises a point of sale device, which is used to enter the at least some transaction details into the audio coupler.

24. The method according to claim 1, in which the causing of an acceptance signal or rejection signal to be output to the user comprises the service processing unit instructing the input output device to output an acceptance signal or rejection signal.

25. The method according to claim 24, in which the input output device outputs the acceptance signal or rejection signal via a voice bearer channel of the telecommunications network.

26. The method according to claim 24, in which the input output device outputs the acceptance signal or rejection signal via at least one data bearer channel of the telecommunications network.

27. The method according to claim 24, in which the input output device sends the acceptance signal or rejection signal to the telecommunications network access instrument, for output to the user.

28. The method according to claim 24, in which the input output device sends the acceptance signal or rejection signal to a point of sale device, for output to the user.

29. The method according to claim 1, in which the causing of an acceptance signal or rejection signal to be output to the user comprises the service processing unit instructing the interface device to output the acceptance signal or rejection signal.

30. The method according to claim 29, in which the interface device outputs the acceptance signal or rejection signal via a voice bearer channel of the telecommunications network.

31. The method according to claim 29, in which the interface device outputs the acceptance signal or rejection signal via at least one data bearer channel of the telecommunications network.

32. The method according to claim 29, in which the interface device sends the acceptance signal or rejection signal to a point of sale (POS) device using the telecommunications network access instrument signal, which is disconnected from the input output device and connected to the POS device.

33. The method according to claim 32, in which the acceptance signal comprises a CLI presentation number which comprises an amount of the transaction, and the POS device outputs the CLI presentation number as a visual signal using a display unit.

34. The method according to claim 32, in which, upon receiving the acceptance signal, the POS device sends a signal to the service processing unit confirming that the transaction may proceed.

35. The method according to claim 1, in which the causing of an acceptance signal or rejection signal to be output to the user comprises the service processing unit sending the acceptance signal or rejection signal to a point of sale (POS) device using a telecommunications network link or data link.

36. The method according to claim 35, in which the causing of an acceptance or rejection signal to be output to the user comprises the service processing unit deriving data identifying the link from the transaction details.

37. The method according to claim 1, in which, for the transaction to be carried out, the service processing unit sends the transaction details and the service identity and user identity data to a billing service.

38. The method according to claim 1, in which, to use the cashless transaction service, the user is provided with an account, which is debited or credited on carrying out the transaction using the service.

39. The method according to claim 1, in which the transaction is carried out by debiting an existing account for the user which uses the telecommunications network.

40. The method according to claim 1, in which the user is required to use a security code for authorization of the transaction, without which the transaction cannot proceed.

41. The method according to claim 40, in which the security code is sent to the input output device.

42. The method according to claim 41, in which the security code is sent to the input output device via a voice bearer channel of the telecommunications network.

43. The method according to claim 41, in which the security code is sent to the input output device via at least one data bearer channel of the telecommunications network.

44. A telecommunications network providing a cashless transaction service comprising: an interface device; a service processing unit; and an input output device; in which the interface device accepts signals from a telecommunications network access instrument, extracts service identity and user identity data from an access instrument signal, and passes the data to the service processing unit; in which the service processing unit processes the data, instructs the interface device to forward the access instrument signal to the input output device, and instructs the input output device to request details of the cashless transaction; in which the input output device receives the transaction details from the telecommunications network access instrument, the transaction details comprising vendor identification data, including the vendor or a code associated with the vendor, and vendor location data including a code associated with a branch of the vendor and/or a point of sale (POS) device in a branch of the vendor and/or a point of sale (POS) device in the branch at which the transaction is to be carried out, at least some of the transaction details being held by the POS device, said at least some of the transaction details being sent to the input output device, and passes them to the service processing unit; and in which the service processing unit decides whether or not the transaction can proceed, causes output of a signal conveying acceptance or rejection of the transaction, and, if the transaction can proceed, arranges for the transaction to be carried out.

45. The telecommunications network according to claim 44, in which the service processing unit causes the signal conveying acceptance or rejection of the transaction to be sent to the point of sales (POS) device using a telecommunications network link or data link, and in which the service processing unit derives data identifying the link from the transaction details.

46. A cashless transaction service adapted to be provided on a telecommunications network comprising: means for extracting service identity and user identity data from a signal from a telecommunications network access instrument, means for processing the data, means for instructing an interface device of the telecommunications network to forward the access instrument signal to an input output device of the telecommunications network, means for instructing the input output device to request details of the cashless transaction, means for receiving the transaction details from the telecommunications network access instrument, the transaction details comprising vendor identification data, including the vendor or a code associated with the vendor, and vendor location data including a code associated with a branch of the vendor and/or a point of sale (POS) device in the branch at which the transaction is to be carried out, at least some of the transaction details being held by the POS device, said at least some of the transaction details being sent to the input output device, means for processing the transaction details and deciding whether or not the transaction can proceed, means for causing output of a signal conveying acceptance or rejection of the transaction, and means for, if the transaction can proceed, arranging for the transaction to be carried out.

47. The service according to claim 46, which is provided as software held on a service processing unit of the telecommunications network.

48. The cashless transaction service according to claim 46, in which the means for causing output of a signal conveying acceptance or rejection of the transaction include means for sending the signal to a point of sale (POS) device using a telecommunications network link or data link and means for deriving data identifying the link from the transaction details.

* * * * *

UNITED STATES PATENT AND TRADEMARK OFFICE
CERTIFICATE OF CORRECTION

PATENT NO.        : 7,433,452 B2                                    Page 1 of 1
APPLICATION NO.   : 10/506919
DATED             : October 7, 2008
INVENTOR(S)       : Taylor et al.

It is certified that error appears in the above-identified patent and that said Letters Patent is hereby corrected as shown below:

In Column 9, Line 39, delete "meals" and insert -- means --, therefor.

Signed and Sealed this

Seventeenth Day of November, 2009

David J. Kappos
*Director of the United States Patent and Trademark Office*